United States Patent [19]

Uesugi et al.

[11] 4,258,996
[45] Mar. 31, 1981

[54] DIAPHRAGM CONTROL MECHANISM FOR CAMERA OBJECTIVES

[75] Inventors: Kyozo Uesugi, Sakai; Osamu Tanaka, Hashimoto, both of Japan

[73] Assignee: Minolta Camera Kabushiki Kaisha, Osaka, Japan

[21] Appl. No.: 69,539

[22] Filed: Aug. 24, 1979

Related U.S. Application Data

[63] Continuation of Ser. No. 883,679, Mar. 6, 1978, abandoned.

[30] Foreign Application Priority Data

Mar. 10, 1977 [JP]  Japan ................................ 52/29238

[51] Int. Cl.³ .............................................. G03B 9/02
[52] U.S. Cl. .................................................... 354/196
[58] Field of Search .................... 354/40, 45, 47, 196, 354/232, 270, 272, 286

[56] References Cited

U.S. PATENT DOCUMENTS

| | | | |
|---|---|---|---|
| 3,013,478 | 12/1961 | Gebele | 354/45 |
| 3,098,421 | 7/1963 | Ohara | 354/272 |
| 3,906,529 | 9/1975 | Filipovich | 354/196 |
| 3,997,906 | 12/1976 | Kashiwase | 354/196 |
| 4,141,636 | 2/1979 | Shimojima | 354/196 |

*Primary Examiner*—Donald A. Griffin

[57] ABSTRACT

A diaphragm control mechanism for a camera objective wherein the diaphragm aperture is maintained fully open before camera operation in order to facilitate framing and focusing of the objective system and is then stopped down in response to a camera release operation to a value manually preset or automatically determined. The fully open diaphragm aperture is adjusted in accordance with movement of a component or components of the objective for the sake of adjustment of the objective, for example, to change its focal length. The improvement according to the present invention lies in the construction of the fully open diaphragm aperture adjusting mechanism wherein a movable member which is included in the link system for the stopping down of the diaphragm bears against a periphery cam or cam edge of a fixed member fixedly mounted in the lens barrel of the objective independently of the link system so that the fully open diaphragm aperture is adjusted as a function of the contact point between the movable member and the cam, with the movable member being allowed to move away from the cam upon the diaphragm stopping down operation of the link system.

8 Claims, 3 Drawing Figures

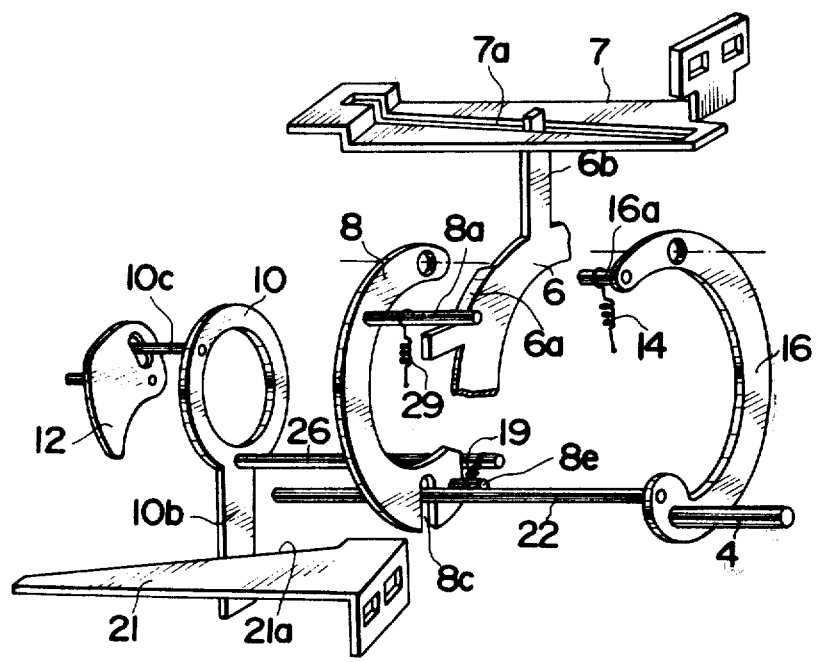

DIAPHRAGM CONTROL MECHANISM FOR CAMERA OBJECTIVES

This application is continuation of application Ser. No. 883,679 filed Mar. 6, 1978 and now abandoned.

BACKGROUND OF THE INVENTION

1. Field of the Invention

The present invention relates to a diaphragm control device incorporated in a lens barrel which includes an automatic diaphragm preset mechanism which retains the diaphragm in a fully open aperture position prior to photography and stops down the diaphragm to a preset aperture value during a camera photographing operation. More particularly, the present invention relates to a diaphragm control device for adjusting the fully open aperture in accordance with a lens adjustment, such as a zooming operation.

2. Description of the Prior Arts

There have already been proposed control devices for adjusting the fully open aperture in a camera in accordance with, for example, a zooming operation, for example, in Japanese published patent specification No. 40-20911, Japanese laid-open-patent specification No. 49-24134, and U.S. Pat. No. 3,889,282. As shown in FIG. 1, however, a typical conventional device comprises an arrangement in which the relative position between motion transmitting members is changed by a correction member which moves along with a component contained in the link system traced from main driving lever 16 (which is biased counter-clockwise by main spring 14) to aperture setting lever 8. In the conventional device, pin 4 follows control lever 2 on a camera body side to rotate aperture setting lever 8 counterclockwise in the diagram to thereby cause fixed pin 8a carried thereby to abut upon aperture control cam 6a so as to determine an angular position of diaphragm operating ring 10 and a diaphragm aperture defined by diaphragm blades 12, i.e., when the control lever 2 moves in the direction of the arrow in response to a camera shutter release operation. Namely, in an example of operation of a device according to FIG. 1, downward extension 8b of aperture setting lever 8 is fitted in correction slot 20b formed in axial extension 20a of intermediate member 20 which is biased clockwise by spring 18, and when aperture setting lever 8 moves in linkage with a zooming operation along the optical axis relative to intermediate member 20, together with diaphragm operating ring 10 and diaphragm blades 12, aperture setting lever 8 rotates relative to intermediate member 20 to thereby adjust the diaphragm aperture.

In such a conventional device, however, the weight of any one of the members in the link system increases by as much as that of the correction member, resulting in an increase in the moment of inertia. Thus, there have arisen the problems as follows:

(I) It becomes difficult to obtain the desired diaphragm dynamic characteristics. (Too much time is required for the diaphragm blades to become stable, for example.)

(II) A large moment of inertia necessitates increased strength of the parts.

(III) The requirements for cam designing for the correction member lessen flexibility in optical designing.

(IV) A solution to the above-described problems results, in all instances in costly designing.

SUMMARY OF THE INVENTION

Accordingly, the primary object of the present invention is to provide a diaphragm control device which is free from the above problems. To attain this object, the invention includes a full-open aperture correction member that is independent of the link system for driving the aperture.

According to the present invention a governing member for the fully open aperture adjustment is independent of a link system for driving aperture, thereby allowing the moment of inertia of any component in the system to be small when the diaphragm is stopped down, so that it is possible to obtain desired diaphragm dynamic characteristics and that the durability of the automatic diaphragm stopping-down mechanism is improved. In addition, the solution to the problems related to mechanical parts results in increased flexibility in optical designing, thus bringing about remarkable effects, particularly a small moment of inertia with minimum operating noise which is greatly convenient for a user.

BRIEF DESCRIPTION OF THE DRAWINGS

FIGS. 2 and 3 show perspective views of the essential portions of preferred embodiments of the present invention.

DETAILED DESCRIPTION OF THE PREFERRED EMBODIMENTS

Figure 1:
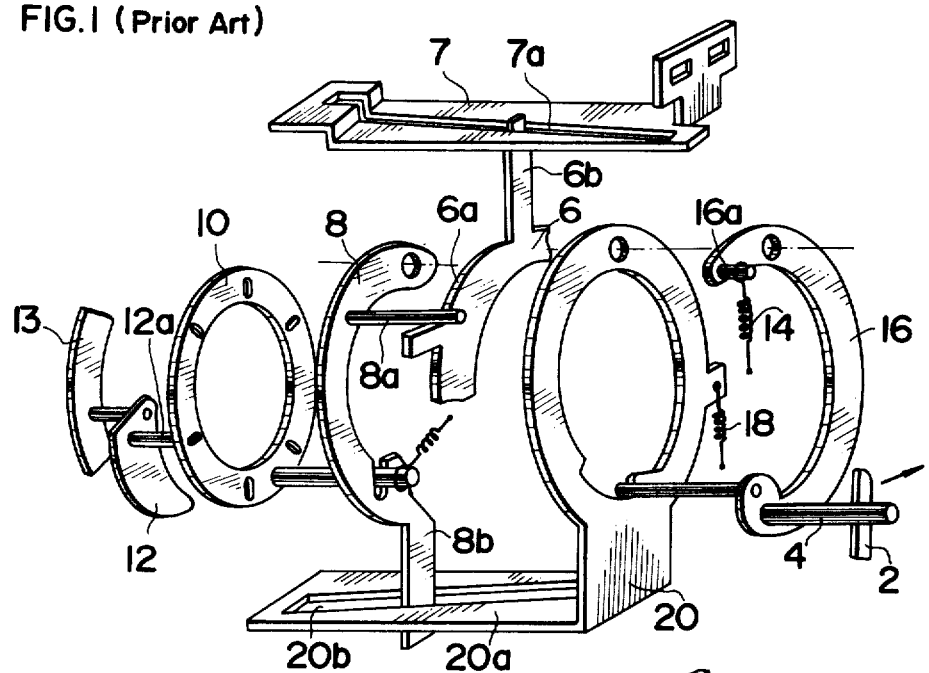
FIG. 1 shows perspective view of the essential portions of a conventional device.
Figure 2:
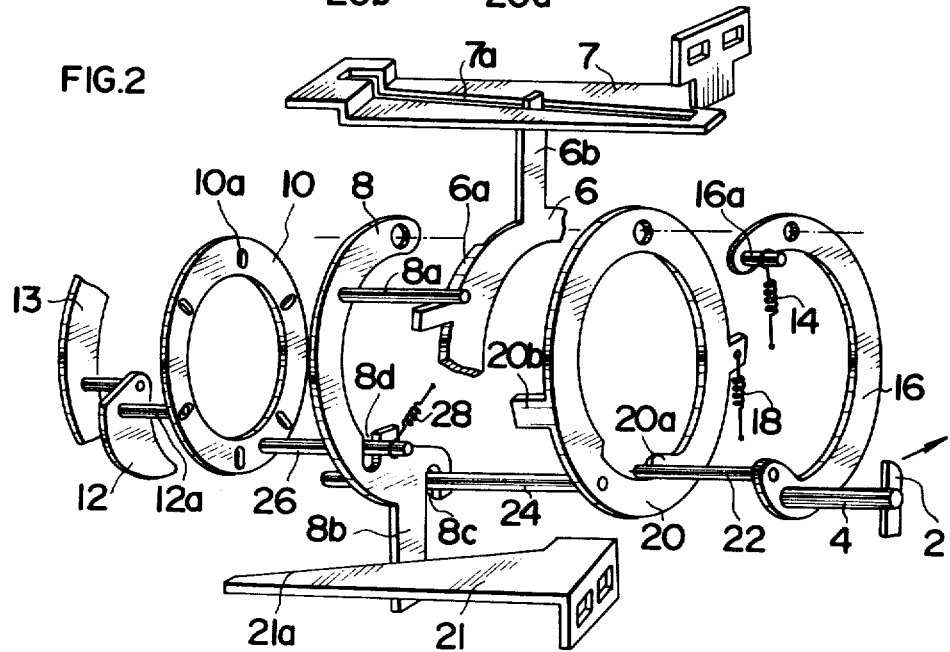

FIG. 2 shows an embodiment according to the present invention, wherein the same reference numerals are used for the members which correspond to those in FIG. 1. Referring to FIG. 2, main driving member 16 carries three pins, one of which (element 4 extending to the camera body side) engages control lever 2 in the camera body (not shown). A second pin, drive linking pin 22, engages intermediate ring 20. A third pin, pin 16a, is used to bias main driving lever 16 counterclockwise at all times via main spring 14. Projection 20a, which engages the drive linking pin 22, and pin 24, which engages first slot 8c of aperture setting lever 8, are fixed on intermediate ring 20 which is itself biased clockwise by means of spring 18. On aperture setting lever 8 are fixed second slot 8d, aperture setting pin 8a and extension 8b. On diaphragm operating ring 10 are fixed pin 26, which fits in second slot 8d of the aperture setting lever 8. The diaphragm operating ring 10 is formed with slots 10a to receive driving pins 12a of diaphragm blades 12. Fixing ring 13 is secured in place inside a fixed portion of a lens barrel cylinder (not shown). Diaphragm adjustment member 7 is fixed to an aperture presetting member (not shown) and is movable circumferentially in response to an aperture presetting operation. Extension 6b of the aperture cam plate 6 is fitted in cam slot 7a of the diaphragm adjustment member 7 to slide along the slot in accordance with the movement of an optical system. Fully open aperture adjustment member 21 is mounted on a fixed portion of the lens barrel (not shown), and cam surface 21a thereof is in contact with the outer edge of extension 8b of the aperture setting lever 8.

The operation of the above arrangement will be explained. After completion of a photographing operation, main driving lever 16 is pushed clockwise against the force of spring 14 by the control lever 2 in the camera body through first pin 4, and then the diaphragm is maintained at a full-open aperture position by the control lever 2. Projection 20a follows drive linking pin 22 on the main driving lever 16 by the force of spring 18, thus causing intermediate ring 20 to rotate clockwise. A divergence arising hereupon between the fully open aperture position of control lever 2 in the camera body and that of the automatic diaphragm stopping-down mechanism in the lens barrel can be covered by a so-called overcharge by means of spring 18, with a gap occurring between the projection 20a and the pin 22 at the full open aperture condition. Therefore, aperture setting lever 8 operates integrally with respect to rotational direction with intermediate ring 20 through pin 24 carried thereby, and when main driving lever 16 and intermediate ring 20 are maintained in the fully open aperture position by control lever 2 on the camera body side, extension 8b of aperture setting lever 8 bears against cam surface 21a, by the force of spring 18, for diaphragm adjustment. When aperture setting lever 8 moves along the optical axis following the movement of the optical system, extension 8b moves with its side edge bearing against diaphragm adjustment cam surface 21a. This contact causes aperture setting lever 8 to angularly move to rotate diaphragm operating plate 10 via pin 26, to thereby adjust a diaphragm aperture properly in response to the movement of the optical system.

When control lever 2 retracts or moves rightward in accordance with the camera shutter release operation, main driving lever 16 drives pin 22, projection 20a, pin 24, aperture setting lever 8 and pin 26 by the force of spring 14 to stop down the diaphragm. Thus, an aperture is determined when pin 8a of aperture setting lever 8 abuts upon cam surface 6a after traveling the distance between the pin 8a and the cam surface 6a. Since diaphragm cam plate 6 engages diaphragm plate 7, adjustment or correction of the set diaphragm aperture is made in response to a preset aperture value and movement of the optical system. Spring 28 is an auxiliary spring to urge diaphragm operating plate 10 always in a fixed direction so as to stabilize the diaphragm aperture and improve diaphragm movement characteristics.

When the diaphragm is maintained in a fully open aperture position by control lever 2 on the camera body side, operating member (not shown) mounted outside the lens barrel pushes bent portion 20b of intermediate 20 in response to depression of the operating member. Intermediate ring 20 angularly moves against the force of spring 18. This angular movement causes the same operation as normal stopping-down to occur for the diaphragm to be stopped down therefrom, thereby making it possible to check a depth of field by means of a so-called preview which allows observation of the object image through a diaphragm aperture stopped-down to the preset value.

FIG. 3 shows another embodiment of the present invention in which the same reference numerals are used for the members which correspond to those in FIG. 2. Referring to FIG. 3, main driving lever 16 carries element 4 extending to the camera body, drive linking pin 22 and pin 16a, and is biased counterclockwise by spring 14. Slot 8c formed on aperture setting lever 8 receives drive linking pin 22. Pin 26 carried by diaphragm operating plate 10 and pin 8e of aperture setting lever 8 are coupled with each other by spring 19. Extension 10b is formed on diaphragm operating plate 10 to contact diaphragm adjustment cam 21a. Diaphragm blades 12 are driven by pins 10c of diaphragm operating plate 10. Aperture control cam plate 6 is identical to that in the first embodiment of the present invention.

An explanation will be given regarding the operation of this alternate embodiment. Upon completion of a photographing operation, element 4 on the camera body side is moved clockwise by control lever 2 against the force of main spring 14 and then is maintained in the fully open aperture position. Aperture setting lever 8 angularly moves integrally with main driving lever 16 and pin 22. Extension 10b for fully open diaphragm adjustment is a part of diaphragm operating plate 10 and bears against fully open diaphragm adjustment cam 21a, by means of overcharge spring 19 in a manner similar to that of the first embodiment of the present invention. The aperture setting operation is exactly the same as that in the first embodiment. Spring 29 urges aperture setting lever 8 always counterclockwise so as to enhance the desired diaphragm movement characteristics obtained by main spring 14 and spring 19. In the present embodiment, a member corresponding to the intermediate ring 20 in the first embodiment is not in existence. Accordingly, the preview for checking the depth of field must be carried out through a mechanism equipped in the camera body to move the control lever 2 in response to a manual operation.

It is to be understood that the present invention is not confined to the above-described two embodiments. For example, fully open diaphragm adjustment member 21 may be moved in response to lens adjustment, in place of movement of the aperture setting lever and the diaphragm operating ring. The movement thereof may also be in any direction other than that along the optical axis, such as a vertical direction, depending on the design. Further, the cam surface may not necessarily be provided if diaphragm adjustment member 21 is designed to move in the rotational direction of the aperture setting lever and the diaphragm operating ring. In addition, the present invention may be applicable to any fully open diaphragm aperture adjustable lens control operation other than for zooming, such as a close-up photograph setting operation.

We claim:

1. In a photographic camera objective which defines an optical axis and which is adjustable for changing its optical property, and which includes diaphragm means for defining a diaphragm aperture, a link system responsive to camera operation to maintain the diaphragm aperture fully open with the camera at a pre-exposure condition and to stop down the diaphragm aperture to a desired value upon a camera release operation, and an adjusting mechanism for adjusting the fully open diaphragm aperture in accordance with the adjustment of the objective, the improvement wherein the adjusting mechanism comprises:

a cam member mounted independently of the link system; and a movable member attached to a part of said link system to extend radially away from said optical axis, said movable member being movable in a first direction with said diaphragm means in accordance with the operation of said link system and movable in a second direction in accordance with the adjustment of said objective;

means for urging said movable member along said first direction to abut the movable member to said cam member when said link system is at the diaphragm-aperture-full-open condition, said cam member having a periphery cam portion engageable with said movable member and extending substantially along the second direction so that the position of said movable member with respect to the first direction at the full open aperture condition of said link system may be controlled by the periphery cam with said movable member being mounted to move away from the periphery cam in accordance with stop-down operation of said link system.

2. The photographic objective as claimed in claim 1 wherein said objective further includes a lens barrel having a fixed portion and said cam means includes a cam plate fixed on the fixed portion of said lens barrel.

3. The photographic camera objective as claimed in claim 1 wherein said link system includes a driving member for driving through said movable means said diaphragm means from full open to desired aperture position, and said urging means is disposed in the linkage from the driving member to the movable member such that the urging means biases the movable member with the driving member being retained at full aperture position.

4. The photographic camera objective as claimed in claim 1 wherein said link system further includes a diaphragm operating ring directly coupled with said diaphragm means to open and close the diaphragm aperture as a function of angular position of the ring, and said movable member being formed integrally with said operating ring.

5. The photographic camera objective as claimed in claim 1 wherein said objective further includes a second cam positionable in accordance with manual diaphragm aperture setting and said link system further includes a diaphragm aperture determining lever movable in relation with a diaphragm stopping down operation of said link system towards said second cam until stopped thereby to determine the diaphragm aperture.

6. The photographic camera objective as claimed in claim 1 wherein said first direction is parallel to the optical axis of the objective and said second direction is perpendicular to the axis.

7. The photographic camera objective as claimed in claim 1 wherein said movable member is movable in response to a zooming operation to the objective.

8. A diaphragm control mechanism for camera objective which defines an optical axis and which is adjustable for changing its optical property and which includes diaphragm means for defining a diaphragm aperture, said diaphragm aperture being maintained fully open at the pre-exposure condition of the camera coupled with the objective, and stopped down to a desired size in response to a release operation to the camera, said diaphragm control mechanism comprising:

a driving member for driving said diaphragm means in response to the camera release operation;

a first bias means for urging said driving member in the direction to stop down the diaphragm means, said driving member being retained in a charged position against said first bias means at said pre-exposure condition of the camera;

a link system for transmitting the movement of said driving member to said diaphragm means, said link system being interconnected with the driving member in the manner that said driving member, when moving in said diaphragm stop down direction, pushes said link system;

a second bias means for urging said link system so that said link system follows said driving member when said driving member moves opposite to said stop down direction;

a movable member attached to a part of said link system to extend radially away from said optical axis, said movable member being movable together with said link system; and means located in the path of said movable member to be engaged thereby when said link system follows said driving member, and to control, through said movable member and said link system, fully open diaphragm aperture, said movable member and said engageable means being movable relative to one another in the direction different from that of the movement of said movable member with said link system following said driving member, said engageable means being mounted independently of the movement of said link system allowing said movable member to be driven by said driving member.

* * * * *